J. R. DONNELLY.
GAS PRODUCER.
APPLICATION FILED JUNE 15, 1912.
1,214,657.
Patented Feb. 6, 1917.
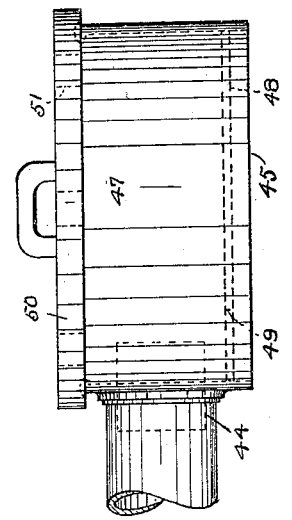
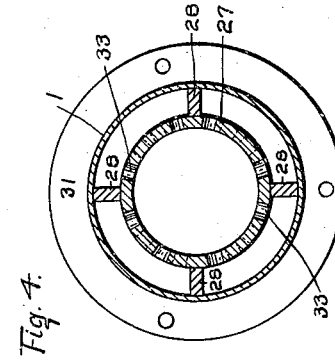
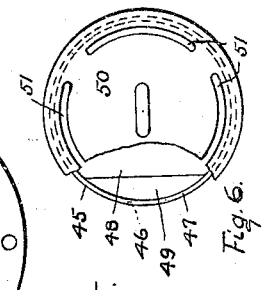
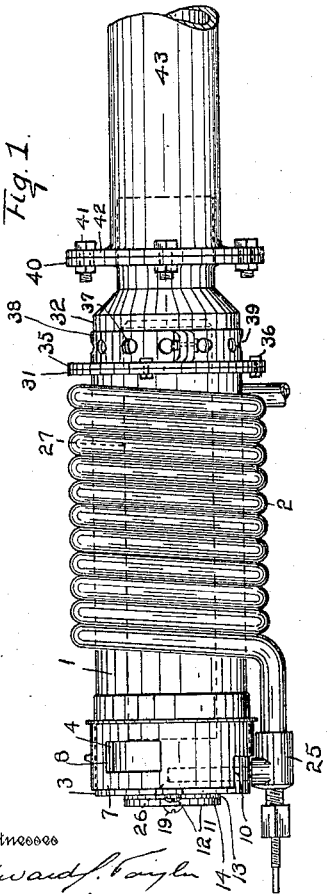
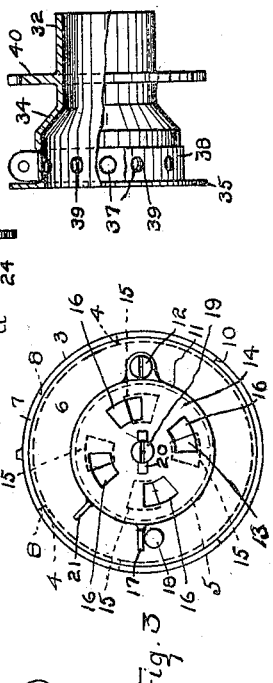
Inventor
John R. Donnelly
by
Taylor & Hube
Attorneys

UNITED STATES PATENT OFFICE.

JOHN R. DONNELLY, OF FORT WAYNE, INDIANA, ASSIGNOR TO WAYNE PROCESS COMPANY, OF FORT WAYNE, INDIANA, A CORPORATION.

GAS-PRODUCER.

1,214,657.

Specification of Letters Patent.

Patented Feb. 6, 1917.

Application filed June 15, 1912. Serial No. 703,874.

*To all whom it may concern:*

Be it known that I, JOHN R. DONNELLY, a citizen of the United States, and resident of Fort Wayne, in the county of Allen and State of Indiana, have invented new and useful Improvements in Gas-Producers, of which the following is a specification.

My present invention relates to improvements in gas producers in which liquid hydrocarbon, such as oil, is converted into a gas, and its objects are to provide a device which shall be highly efficient and economic and substantially noiseless in operation, and which shall produce a gas very rich in quality and highly useful as a fuel.

In the drawings Figure 1 is a side elevation of a device constructed according to my invention, showing the same applied as a heater for furnaces, metal pots, stoves and the like; Fig. 2, a vertical section of the outer shell and head showing the generating bushing partially in section; Fig. 3, a rear end view of the head; Fig. 4, a view on line *a—a* of Fig. 2; Fig. 5, a side elevational view, partially in section, of the air mixer and Fig. 6, a plan view of the burner partially in section.

Referring to the drawings, the generator or producer comprises a tubular shell 1 of suitable material about which is coiled the vaporizing coil 2. Secured to the rear extremity of shell 1 is head 3, which is preferably cup-shaped and serves as a closure for the rear end of shell 1. A suitable number of openings 4 are provided in the annular wall of head 3 and an opening 5 is provided in the rear or flat wall 6 of the head. A collar 7 encircles and is revolubly mounted on head 3 and is provided with openings 8 corresponding to openings 4 in the head as to relative size and arrangement. A suitable lug 9 on collar 7 serves as a means by which the collar may be rotated on head 3 to bring openings 8 more or less into register with openings 4. The lower portion of collar 7 is cut away or slotted as at 10 to accommodate valve 25, hereafter described, and thereby permit the collar to be rotated on the head in order that the collar may completely close openings 4.

A shutter 11 is pivoted by screw 12 to the exterior face of the rear wall 6 of head 3. Shutter 11 covers opening 5 and consists of two disks 13 and 14, disk 13 having a suitable number of openings 15 which are adapted to be exposed more or less by disk 14, which latter disk is provided with similar openings 16, the latter openings being preferably less in area than openings 15. Disk 13 is provided with a lug 17 which engages a lug 18 on back 6 so that the disk will normally be held in the position of covering opening 5. Disk 14 is centrally pivoted by screw 19 to disk 13 and is revoluble on its pivot to cause openings 16 therein to expose openings 15 in disk 13 as desired. A spring 20 on pivot 19 bears against disk 14 and tends to hold the disk in any adjusted position relatively to disk 13. A lug 21 on disk 14 serves as a means for easily rotating the same. If the operator desires to expose the entire opening 5 he swings disks 13 and 14 as a unit upwardly on pivot 12, until the opening is cleared. When disk 14 closes the openings 15 in disk 13 its lug 21 bears against lug 17.

Near the forward extremity of shell 1 may be provided a suitable number of openings 22, and encircling the shell is a collar 23 having openings 24 corresponding to openings 22, the collar and openings serving as a means for admitting air between the shell and bushing 27 hereafter described. Collar 23 and the openings 22, 24 may be omitted as hereafter explained.

The forward end of vaporizing coil 2 is connected to a suitable pressure reservoir containing the fuel (not shown) and the rear end of the coil is connected to a suitable valve 25 which is preferably arranged beneath head 3. A suitable nozzle 26 is in threaded engagement with the body of valve 25 and extends through the wall of head 3 into the interior of the head.

Within shell 1 is supported bushing 27 which is preferably tubular in form and is provided on its periphery with a suitable number of longitudinally extending ribs 28 by which the bushing is spaced from shell 1, thereby providing an air space between the bushing and shell. The ribs do not necessarily extend the full length of the bushing but may terminate short of both ends. A washer or flange 29 may be arranged on the bushing adjacent the rear ends of ribs 28, the periphery of which substantially coincides with the inner periphery of member 1, and on the bushing a suitable distance rearwardly from its forward end are provided a boss 30 and flange 31, the boss fitting snugly into shell 1 and flange 31 being adjacent the forward end of shell 1 and projecting outwardly from the bushing a suitable distance. Flange 31 serves as a means by which the mixer 32 may be attached to the bushing. At a suitable point in bushing 27 preferably adjacent the forward ends of ribs 28 I may provide a suitable number of openings 33, the purpose of which will be explained hereafter.

Mixer 32 consists of a tubular shell 34 having its forward portion reduced in diameter. The diameter of the rear portion of the mixer is substantially that of shell 1 and at its rear end it is provided with a flange 35 which is adapted to be secured to flange 31 by bolts 36. The rear portion is also provided with a suitable number of openings 37 which are adapted to be closed or exposed by collar 38 which is provided with similar openings 39 and is revoluble on said rear portion of the mixer.

A flange 40 is provided at a suitable point on mixer 32 to which may be secured, by bolts 41, flange 42 on one end of pipe 43, the pipe and the reduced end of mixer 32 being telescoped. The other end of pipe 43 is fitted with a connection or coupling 44 which is inserted in a suitable opening 46 in the side wall 47 of burner 45. Burner 45 may be of any suitable construction. In the drawing it is shown as consisting of a cylindrical vessel the bottom 48 of which is disposed a suitable distance above the lower edge of the side wall 47. Adjacent opening 46 the bottom 48 is cut away to form an opening 49 to admit air into the burner through the bottom of the same, the inner end of coupling 44 extending a suitable distance over the opening 49 in order that the vapor which discharges from the coupling into burner 45 will siphon in air through the opening. The top 50 of the burner is preferably separable and consists of a plate of suitable material having a suitable number of openings 51 to provide means of egress for the vapor and enable the same to be combusted for the purpose of furnishing heat. The mixer 32, pipe 43 and burner 45 are useful for enabling the producer to furnish heat for various purposes.

I provide openings 22 and adjustable collar 23 on the forward end of shell 1 for the purpose of preventing explosions of the gas in the bushing adjacent the nozzle, or I may omit these openings and collar and provide the washer or flange 29 on the bushing adjacent the inner ends of ribs 28 for accomplishing the same object. In either case there is no explosion of the gas within the bushing. The explosions are probably due to the presence of a siphoning effect in the space between the bushing and the shell which draws gas through openings 33 and said space back to the rear end of the bushing. Openings 22 with their controlling collar or preferably flange 29, break up the siphon thereby preventing explosions.

The operation of the device is as follows: The fuel is supplied to the coil under the desired pressure. The coil is first heated to a vaporizing heat in any convenient manner and when said heat has been accomplished the vapor is permitted to discharge into bushing 27 through nozzle 26, the nozzle having an opening or openings of suitable size through which the vapor may discharge into the bushing. At this stage of the operation shutters 13 and 14 and 7 are wide open to admit plenty of air into bushing 27 and the vapor is lighted at the nozzle. The burning vapor in the bushing in a short time heats the bushing to a red heat at which time shutters 13, 14 and 7 are closed so that no air may enter the head and bushing and vapor valve 25 is closed. All flame within the bushing is thereby extinguished. As soon as the flame is extinguished the vapor valve is again opened and vapor permitted to be discharged into the bushing, through which it passes and through the connected parts to burner 45 at the top of which burner it is ignited. Shutter 14 is rotated at the same time until the proper amount of air is admitted into head 4 and bushing 27 to allow sufficient combustion therein to continue vaporization in the coil 2, and collar 38 is rotated to admit the proper amount of air into mixer 32. The device is now running normally. The main combustion takes place at the burner and is available for heating the interior of a furnace or metal pot or other device. The burner is disposed within the furnace and the generator and mixer are without the same. The bushing remains constantly at a red heat and the generation of vapor continues so long as fuel is delivered to the coil.

There is practically no noise in the operation of the device and the flame at the burner is comparatively pure there being no deposit of soot on any article or part with which it may come into contact and the heat generated is exceedingly intense.

The air space between the bushing 27 and outer shell 1 insulates the coil from the bushing sufficiently to prevent over-heating of the coil, and the openings 33 in the bushing tend to hasten the vaporizing action of the coil.

I have found when the bushing 27 is formed of cast iron that a new one will not remain at a red heat or at a temperature sufficient to maintain the vaporization of the fuel when the vapor is being combusted in the burner—that is, a generator having a new cast iron bushing is not self-vaporizing when the vapor is combusted in the burner.

In order that the bushing shall remain continuously at a red heat while the vapor is being combusted in the burner, I may heat the bushing continuously for several hours by external means or by inserting the bushing within shell 1 and the vaporizing coil and running the apparatus with shutters 7 and 13, 14 open to admit plenty of air and with pipe 43 removed. The vapor is ignited within the bushing and the flame discharges from the end of the same. The bushing is then a combustion chamber in which complete combustion takes place and the heat of the flame brings the bushing to a red heat and maintains that heat while the device is running. After several hours of operation in this manner the bushing assumes a condition—I am inclined to designate it as seasoned—in which it will thereafter retain its red heat while the vapor is also ignited at the burner. But this "seasoning" process of the bushing takes time and expense and I have found that by providing a suitable number of openings 33 in the bushing that the bushing may be used in the generator without previous "seasoning". The openings provide a communication between the interior of the bushing and the shell and enable the bushing to be readily heated initially to a red heat in starting the generator and to retain that heat during the entire time that the generator is in operation as such. The openings permit the heat which is generated within the bushing to reach the shell and vaporizing coil with rapidity yet there is no overheating of the coil, nor any back firing of flame into the bushing—that is, while the flame is occurring at the burner 45.

The vapor discharging from the nozzle strikes the red heated bushing and a sufficient quantity of it is consumed therein to continuously maintain the red heated condition of the same. To the naked eye there is nothing visible except the vapor discharging from the nozzle and the glowing surface of the bushing. Yet sufficient heat is generated within the bushing to continuously vaporize the oil in the coil, the plainly visible flame being entirely at the burners.

The size and number of the discharge openings in the nozzle, the length and diameter of the bushing and vapor coil and the pressure on the fuel all bear certain relations to each other, and these will be proportioned to attain the best results.

By using the generator with mixer 32, pipe 43 and burner 45 removed, the same forms a very efficient torch for brazing purposes and the like. The heat thus produced is also very intense. When the device is run as a brazing torch the air control shutters 7, 13 and 14 are regulated to admit a much larger quantity of air into the bushing than when the device is operating as a gas producer. In the first case the vapor is ignited in the bushing and the flame discharges therefrom, and in the second case the vapor is partially combusted in the bushing and the remainder in the burner or in any other suitable device to which the bushing may be connected. In both cases the device is self vaporizing, the bushing remaining constantly at a red heat during the operation no matter for how long a period of time the device may be run.

What I claim is:

1. In a device of the class described, the combination of a shell, a vaporizing coil on the shell, means to close one end of the shell having apertures for admitting outside air, means to control the passage of air through the apertures, a bushing within the shell having means thereon for closing the other end of said shell, a nozzle connected to the vaporizing coil and adapted in operation to discharge vapor from the coil into the bushing wherein a portion of the vapor is combusted to continuously heat the bushing, and means in connection with the bushing into which the remainder of the vapor is discharged from the bushing and ignited.

2. The combination with a vaporizing coil, of a shell within the coil, a head secured to one end of the shell having a plurality of apertures for the entrance of outside air, means to control the entrance of air through said apertures, a bushing within the shell and in spaced relation to the shell, said bushing having means to close the other end of the shell, a nozzle connected to the vaporizing coil and adapted in operation to discharge vapor from the coil into the bushing and a burner into which, in operation, the vapor is discharged from the bushing and combusted, a portion of the vapor being consumed in the bushing to continuously heat the same.

3. The combination of a vaporizing coil, for conveying liquid fuel under pressure, a shell within the coil, a head secured to one end of the shell and having apertures therein for admitting outside air, means to control the passage of air through said apertures, a bushing within the shell and in spaced relation thereto, means on the bushing for closing the other end of the shell, and a nozzle within the head and connected to the vaporizing coil and adapted in operation to discharge vapor from the coil into the bushing.

4. The combination with a vaporizing coil for conveying liquid fuel under pressure, of a bushing within the coil, means between the coil and bushing for forming an air space between said coil and bushing, a nozzle connected to the coil and adapted, in operation, to discharge vapor from the coil into the bushing, means adjacent one end of the bushing for controllably admitting air into the bushing, and openings in the wall of the bushing for providing communication between the bushing and the air space.

5. The combination with a vaporizing coil for conveying liquid fuel under pressure, of a shell within and adjacent to the coil, a head secured to the rear end of the shell having apertures therein for admitting outside air into the head, a bushing within the shell having ribs thereon which space the bushing from the shell, openings in the wall of the bushing which provide means of communication between the interior of the bushing and the space between the bushing and shell, a boss on the bushing making tight contact with the forward end of the shell, a nozzle connected to the vaporizing coil and adapted in operation to discharge vapor from the coil into the bushing, an air mixer and a burner having connection with the bushing into which vapor is discharged from said bushing and ignited, a portion of the vapor being consumed in the bushing to continuously heat the same.

6. The combination with a vaporizing coil, of a tubular member within the coil, a head secured to the rear end of the member, means to controllably admit outside air into the head, a bushing within the tubular member and concentrically spaced therefrom, means on the bushing at opposite ends for engaging the tubular member and forming with the walls of the tubular member and the bushing a closed air space between said member and the bushing, openings in the bushing for establishing communication between the bushing and the air space, a nozzle connected to the vaporizing coil and adapted in operation to discharge vapor from the coil into the bushing, a portion of the vapor being consumed in the bushing for continuously heating the same and means connected to the bushing for consuming the remainder of the vapor.

7. The combination with a vaporizing chamber for conveying liquid fuel, of a bushing within the chamber, means between the bushing and chamber for forming an air space between them, a nozzle connected to the chamber and adapted to discharge vapor from the chamber into the bushing, means to control the inlet of air into the bushing and openings in the wall of the bushing for providing communication between the bushing and the air space.

8. The combination with a shell, of a bushing within the shell and in spaced relation therewith, the bushing having perforations in its wall, means to controllably admit air into the bushing, a vaporizing chamber exteriorly of the shell and a nozzle connected to the chamber and adapted to discharge vapor from the chamber into the bushing.

In witness whereof I hereunto sign my name this 13th day of June, 1912.

JOHN R. DONNELLY.

Witnesses:
HELEN F. GLENN,
ELWIN W. HULSE.

Copies of this patent may be obtained for five cents each, by addressing the "Commissioner of Patents, Washington, D. C."